Sept. 29, 1970   G. B. GREENE   3,531,079
CONTROLLED FLUID VALVE
Filed April 13, 1966   4 Sheets-Sheet 2
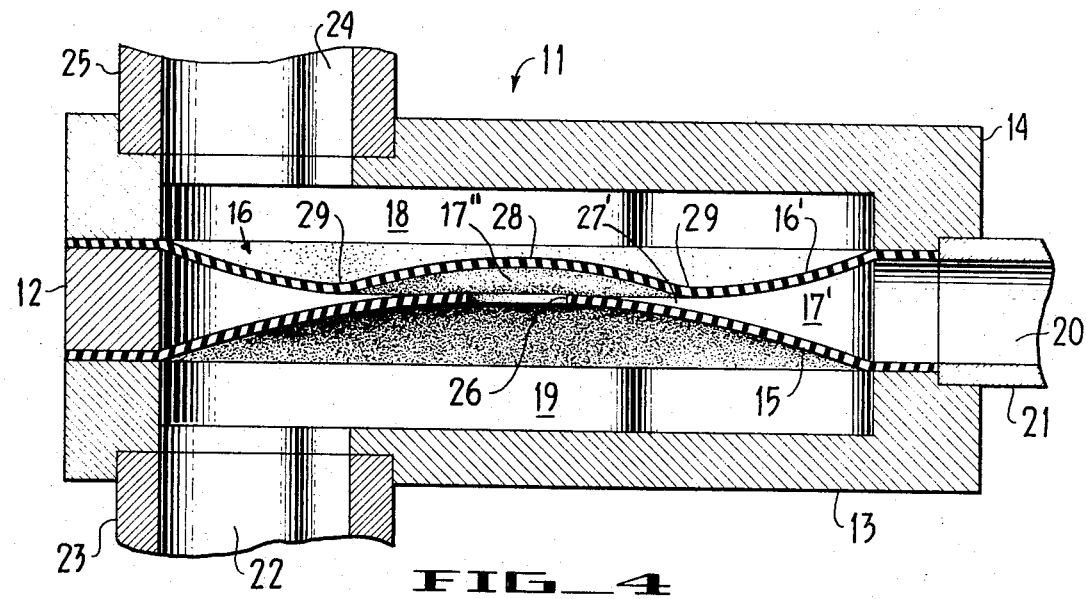
FIG_4
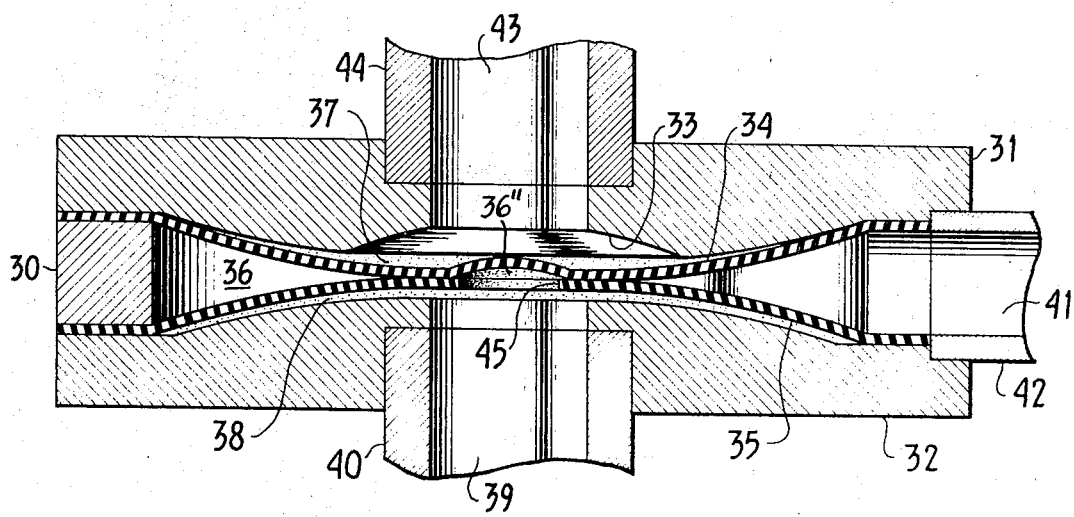
FIG_5

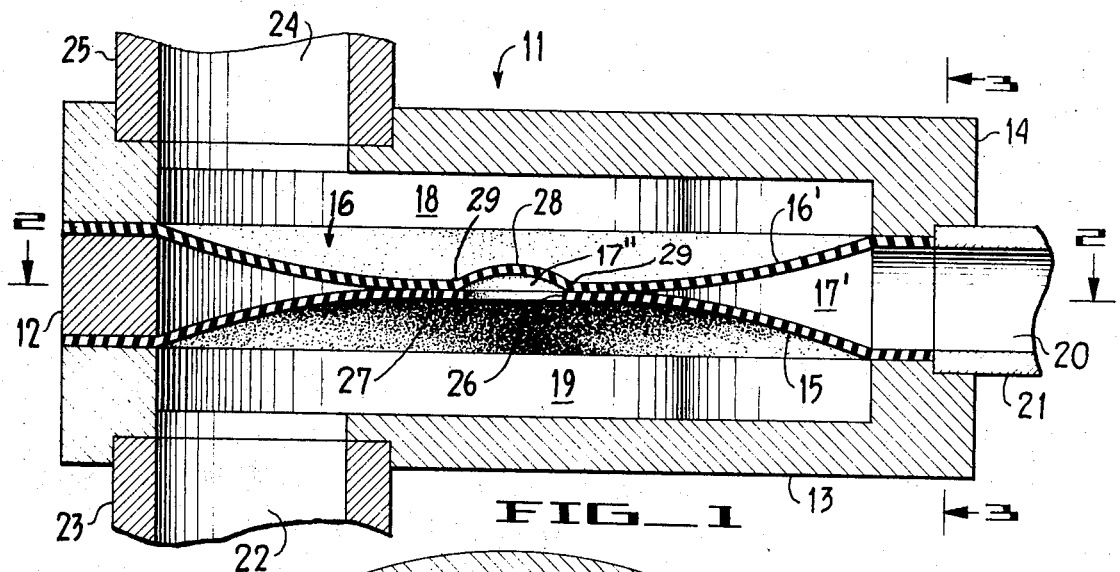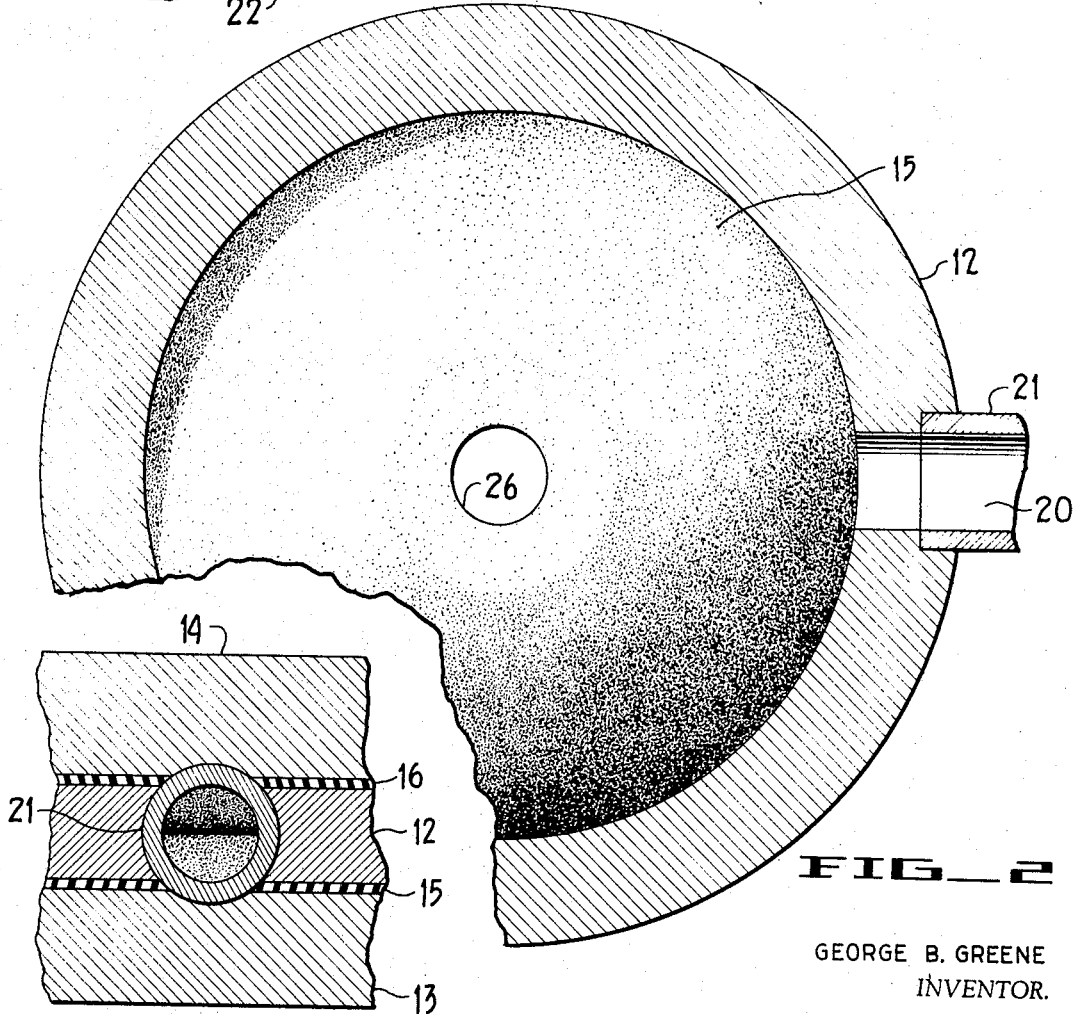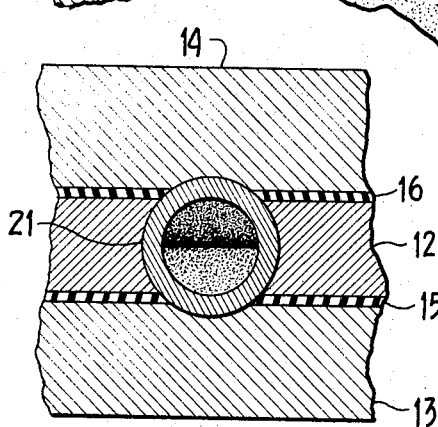

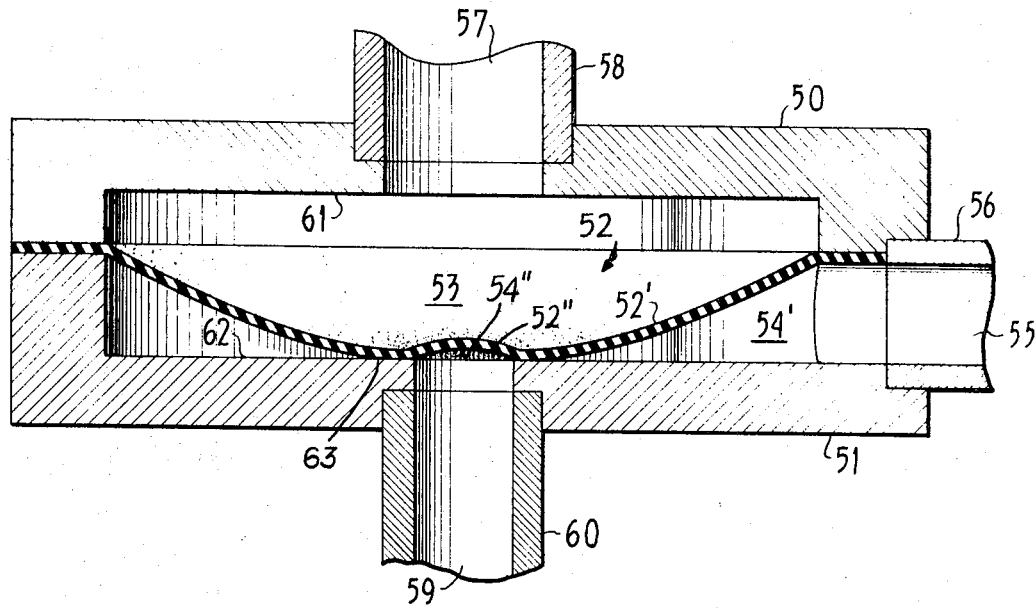
FIG_6A
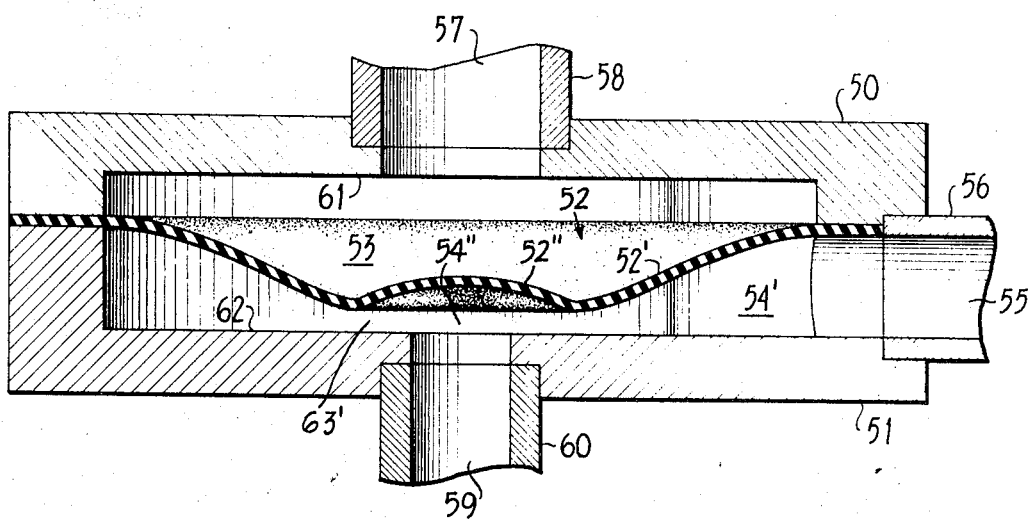
FIG_6B

Sept. 29, 1970  G. B. GREENE  3,531,079
CONTROLLED FLUID VALVE
Filed April 13, 1966  4 Sheets-Sheet 4
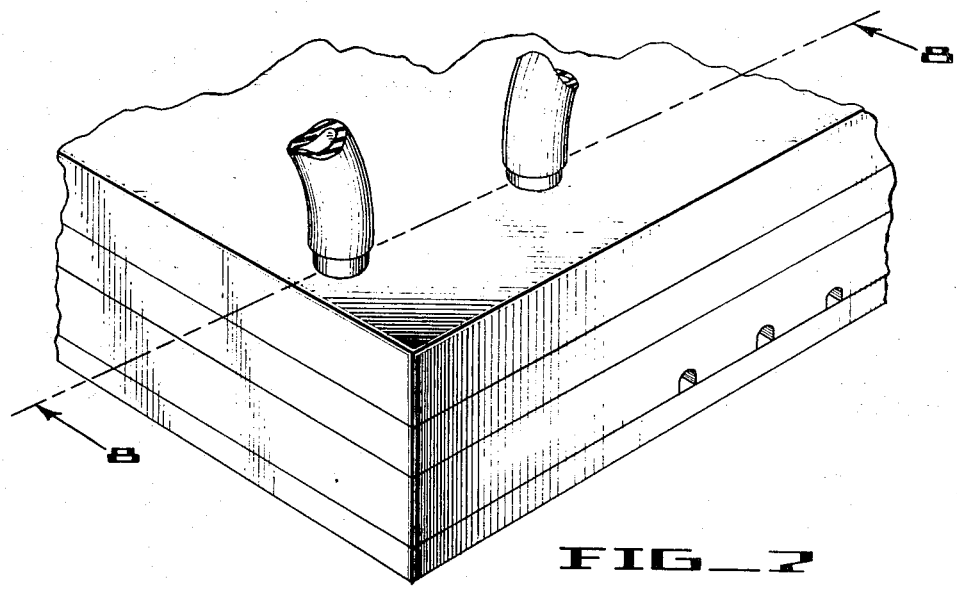
FIG_7
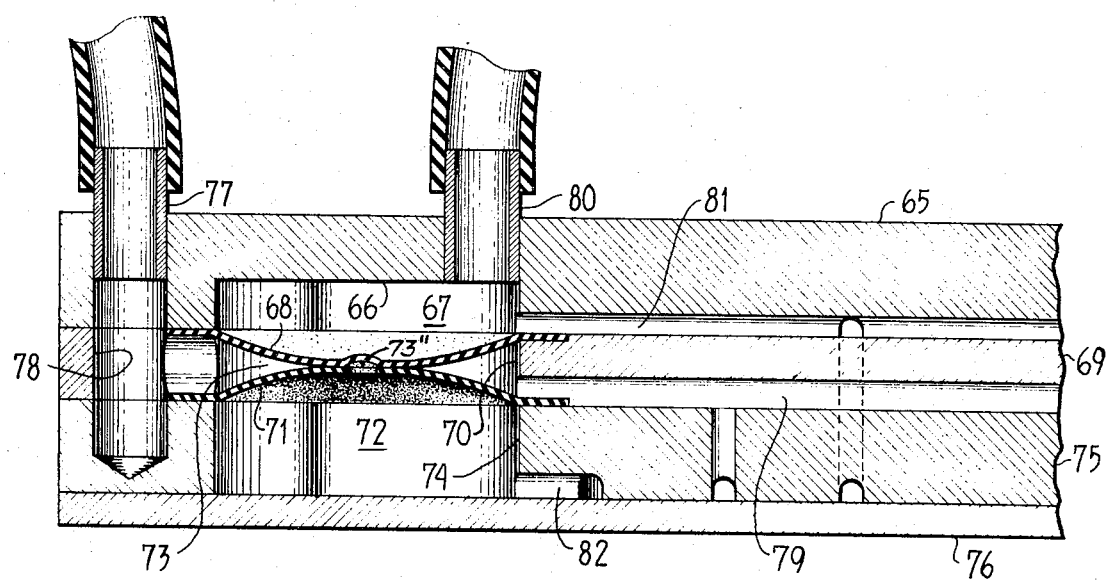
FIG_8

United States Patent Office 3,531,079
Patented Sept. 29, 1970

3,531,079
CONTROLLED FLUID VALVE
George B. Greene, Lafayette, Calif., assignor of ninety percent to Greene Engineering Company, a corporation
Filed Apr. 13, 1966, Ser. No. 542,583
Int. Cl. F16k 7/17
U.S. Cl. 251—61.1    5 Claims

ABSTRACT OF THE DISCLOSURE

A fluid flow control valve having a chamber which is subdivided by a flexible and completely or largely inelastic partition which is capable of being formed by fluid pressure into a shape which contacts a wall of the chamber and thus cuts off fluid flow between two conduits which communicate with different parts of the chamber. In some forms of the invention the partition contacts a second flexible partition which is provided with a vent, rather than the wall of the chamber.

BACKGROUND OF THE INVENTION

This invention relates to fluid valves and more particularly to biased, or controlled, fluid valves.

In the hydraulic, pneumatic and fluid control arts, fluid valves are employed for many reasons long well known to those having ordinary skill in said arts, and also, more recently, for their similarity to electronic devices in logic and computation systems. See, for example, U.S. Pat. No. 3,176,714 and U.S. Pat. No. 3,252,481. In my copending U.S. patent application entitled "Check Valve," Ser. No. 517,534, filed Dec. 30, 1965, the description of which is incorporated herein by reference, I have described a fluid check valve construction which eliminates the need for critical interfitting of valve and seat members and which does not require the use of resilient restoring members which limit the speed of operation of fluid valves. This was accomplished, in one embodiment, by a check valve comprising a chamber having a conduit providing access thereto and opposed flexible walls. At least one of the flexible walls includes venting means having a flow impedance sufficiently large so as to permit inflation of the chamber by pressure applied to said conduit that results in a fluid flow passageway between the conduit and venting means. Deflation of the chamber is accomplished by a reduced pressure applied to said conduit, thereby bringing a sufficient area of the flexible walls into contact to block all fluid flow between the conduit and venting means. This check valve is substantially the functional equivalent of an electronic diode. For example, the valve is either open (conducting) due to a pressure applied to the conduit or closed (nonconducting) due to a reduced pressure at the conduit. As will be obvious to those skilled in the art, such diodes, or check valves, can be readily intercoupled to fabricate fluid logic apparatus. A valuable addition to this check valve in the design and fabrication of fluid logic and computation systems would be a fluid valve having the advantages of the above-identified check valve, but which is substantially the functional equivalent of an electronic triode. Such a triode, or controlled fluid valve, would be responsive to a control or biasing pressure to open and close the valve and to determine the fluid flow through the valve between the open (conducting) and closed (nonconducting) valve positions.

SUMMARY OF THE INVENTION

Accordingly, one object of this invention is to provide a controlled fluid valve which is substantially the functional equivalent of an electronic triode.

Another object of this invention is to provide a fluid valve which is operated by a control or biasing pressure.

Another object of this invention is to provide a controlled fluid valve in which critical interfitting of the valve and seat members is unnecessary.

Another object of this invention is to provide a controlled fluid valve in which restoration of the valve member does not require a resilient restoring member or the application of gravitational force.

Still another object of this invention is to provide a controlled fluid valve characterized by high speed of operation.

A further object of this invention is to provide a controlled fluid valve which can be readily and economically fabricated.

A still further object of this invention is to provide a controlled fluid valve constituted from a minimum number of parts, all of which may be easily fabricated in multiunit assemblies, such that a plurality of said controlled valves may be simply and economically fabricated in a single integral unit.

Briefly described, a controlled fluid valve in accordance with one embodiment of the present invention comprises a housing containing a cavity divided into a central chamber and first and second outer chambers by first and second impermeable, flexible partitions or diaphragms located within said cavity. The second partition includes venting means with at least a portion of said second partition adjacent the venting means constituting a resilient seat with which the first partition may be brought into contact to close the venting means thereby blocking fluid flow between the second outer chamber and the central chamer. The venting means associated with the second partition is adapted to be opened and closed by the first partition due to the relative pressures in said chambers. The term "pressure" as used herein is not limited to super-ambient pressures or gauge pressures, but refers to pressures relative to absolute vacuum. Thus, a given pressure less than ambient atmospheric pressure is thought of herein as having an equivalent vacuum value or degree of vacuum.

A controlled fluid valve, in accordance with still another embodiment of the present invention, comprises a housing with an impermeable, flexible partition or diaphragm contained within the housing which divides the cavity within the housing into first and second chamber portions with the partition being common to and constituting a portion of the peripheries of both the first and second chamber portions. Venting means are associated with said first chamber portion and the partition is adapted to open and close said venting means in response to at least the pressure in said second chamber portion, thereby enabling and blocking, respectively, fluid flow from said venting means into said first chamber portion.

BRIEF DESCRIPTION OF THE DRAWINGS

This invention, as well as other objects, features and advantages thereof, will be readily apparent from consideration of the following detailed description relating to the annexed drawings in which:

FIG. 1 is a cross-sectional view of one embodiment of the present invention and shows a controlled fluid valve in its closed position;

FIG. 2 is a cross-sectional plan view of the device taken along the plane indicated by the line 2—2 of FIG. 1;

FIG. 3 is a partial cross-sectional view of the device taken along the plane indicated by the line 3—3 of FIG. 1;

FIG. 4 is a cross-sectional view similar to FIG. 1 and shows the controlled fluid valve in an open position;

FIG. 5 is a cross-sectional illustration of a modification of the controlled fluid valve illustrated in FIGS. 1, 2, 3 and 4;

FIG. 6A is a cross-sectional illustration of another embodiment of the present invention and shows a controlled fluid valve in its closed position;

FIG. 6B is a cross-sectional view similar to FIG. 6A and shows the controlled fluid valve in an open position;

FIG. 7 illustrates a partial perspective view of an integral unit which may contain a plurality of intercoupled fluid valves; and FIG. 8 is a cross-sectional view, taken along the plane indicated by the line 8—8 of the apparatus shown in FIG. 7.

DESCRIPTION OF THE PREFERRED EMBODIMENTS

Referring now to the drawings, wherein like reference characters designate like or corresponding parts throughout the several views, one embodiment of the present invention is shown in FIGS. 1, 2, 3 and 4. This embodiment comprises a housing 11 which includes a center ring 12 and first and second end plates 13 and 14, respectively. A first circular, flexible diaphragm 16 has its outer circumferential end portion sealed in pressure-tight relationship between the center ring 12 and the second end plate 14. A second circular flexible diaphragm 15 has its outer circumferential end portion sealed in pressure-tight relationship between the center ring and the first end plate 13. The two flexible diaphragms 15 and 16 and the center ring 12 define a central chamber 17 (consisting of toroidal zone, of torus, 17' and central zone 17'', as shown in FIGS. 1 and 4), the first flexible diaphragm 16 and the second end plate 14 define a first outer chamber 18, and the second flexible diaphragm 15 and the first end plate 13 define a second outer chamber 19. Access to the central chamber is provided by a passageway 20, a portion of which is formed by a fluid pipe, or conduit 21. Access to the first outer chamber 18 is provided by an inlet passageway 24, a portion of which is formed by a fluid pipe, or conduit 25, and access to the second outer chamber 19 is provided by an inlet passageway 22, a portion of which is formed by a fluid pipe, or conduit 23.

Each flexible diaphragm 15 and 16 is preformed into a partial spherical section and mounted within the housing 11 such that an exterior portion of each spherically-shaped diaphragm barely touch or "kiss" each other. The second diaphragm 15 contains venting means, such as an aperture, or port 26, which is preferably located in the central area of the space enclosed by the center ring 12. The aperture 26 is sufficiently small so that its flow impedance prevents immediate equalization of a pressure differential across the diaphragm 15 when a suction, or vacuum, is applied to the inlet passageway 20 to evacuate the central chamber. As illustrated in FIG. 1, the diaphragms 15 and 16 are so configured, or shaped, that when operatively assembled within the housing 11, they are capable of meeting over a contact area 27 when impelled inwardly by the evacuation of the central chamber 17. That is, when the pressure within the central chamber 17 is less than the pressure in the first and second outer chambers 18 and 19, the diaphragms 15 and 16 are brought into mutually sealing contact over the contact area 27, causing the valve to be closed, since the aperture or port 26 is sealed by the diaphragm 16, and hence cannot communicate with the central chamber 17 and the passageway 20. When the valve is closed (FIG. 1), contact area 27 divides toroidal zone 17' from central zone 17''. Since passage 20 communicates only with torus 17' when the valve is closed, the final words of the previous sentence might better read "torus 17' and the passageway 20."

In accordance with a preferred mode of operation, the second outer chamber 19 is coupled to atmospheric pressure or a reference pressure by way of the conduit 23 which may, if desired, be controlled by another fluid valve (not shown). The first outer chamber 18 is coupled to a control, or biasing, pressure by way of the conduit 25, and the central chamber is connected to a power source, such as a vacuum pump (not shown), which may or may not be pulsating, by way of the conduit 21. When the fluid valve is closed, as illustrated by FIG. 1, no fluid flow takes place between the second outer chamber 19 and the central chamber 17, due to the venting means 26 being closed by the diaphragm 16. When open on the other hand, as illustrated by FIG. 4, fluid flow takes place between the inlet passage 22 and the passage 20 by way of the second outer chamber 19, the venting means 26, central zone 17'', a circular throat 27' formed by the closely adjacent portions of diaphragms 15 and 16, and the torus 17'. The amount of flow, when the valve is opened, is determined by the pressure or degree of vacuum in the first outer chamber 18. For purposes of explanation, assume that the first and second outer chambers are coupled to atmospheric pressure and the central chamber is connected to a vacuum pump by way of the conduit 21. The flow impedance of the aperture, or port 26 will prevent pressure equalization between the central chamber 17 and the second outer chamber 19. Consequently, the pressure in the central chamber is less than that present in the first and second outer chambers which forces the two diaphragms 15 and 16 together over the contact area 27 to seal the aperture or port 26 as illustrated in FIG. 1. When sealed, no fluid flow can take place between the second outer chamber and toroidal zone 17'', and the valve is closed. Under some operating conditions when the valve is closed, the pressure in the first outer chamber 18 may be slightly less than the pressure in the second outer chamber 19. If so, this slight pressure differential will cause the first diaphragm 16 to form a small blister, or minor dome 28 in an area adjacent the aperture, or port 26. Thus, as shown in FIG. 1, the area of diaphragm 16 may be thought of as divided into two regions, the major dome region 16' and the minor dome region 28, hereinafter called the "major dome" and the "minor dome," respectively.

In order to open the valve, the control pressure in the first outer chamber 18 is reduced below the pressure present in the second outer chamber 19. As the pressure differential between the first and second outer chambers increases, the minor dome 28, illustrated in FIG. 1, increases radially outward until the seal at the contact area 27 between the first and second diaphragms is broken, as illustrated in FIG. 4. Breaking of the seal between the two diaphragms enables fluid flow from the second outer chamber 19 to the torus 17'. The direction of this fluid flow in the central chamber 17 is radially outward from the aperture, or port, 26 via throat 27'. In this valve open condition toroidal zone 17' and central zone 17'' are in communication via throat 27', as shown in FIG. 4. As the control or biasing pressure in the first outer chamber 18 is further reduced, the blister, or minor dome 28 increases further radially outward, thereby enabling an increased fluid flow between the second outer chamber 19 and the torus 17'. In FIG. 1 the blister 28 may be seen to be a substantially spherical portion of the spherical diaphragm 16 which is turned inside out with respect to the major dome portion 16' of diaphragm 16. This characteristic of the minor dome 28 prevents undue stretching of the diaphragm 16 and prevents destructive forces from being set up within the diaphragm that may tend to warp or eventually crack it. The fluid flow between the second outer chamber and the central chamber can be stabilized by stabilizing the control or biasing pressure in the first outer chamber 18. As the control pressure in the first outer chamber is further reduced increased fluid flow is limited by the first diaphragm 16 backing up against the second end plate 14, at which time further reduction of the control biasing potential will not produce an increased fluid between the second outer chamber and the central chamber and the valve will be fully open, or saturated. It has been found that the relationship between the control, or biasing, pressure in the first outer chamber 18 and the flow between the second outer chamber 19 and the torus 17' between the closed state and the fully open state of the valve is substantially linear. In other words, the fluid valve in FIGS. 1, 2, 3 and 4 is substantially the functional equivalent of an electronic triode. That is, when the valve is closed, no fluid flow takes place. When the valve is fully opened, the maximum fluid flow takes place and, by way of the control presure in the first outer chamber 18, the amount of fluid flow between the central chamber and the second outer chamber between the open and closed positions can be varied by varying the control pressure in the first outer chamber.

The basis of the proportional control exerted by the control pressure in the first outer chamber 18 will become more apparent by consideration of FIG. 4. When the control valve is in an oen position, fluid flows upwardly from the second outer chamber 19, through the aperture or port 26, and is deflected radially outwardly by the blister 28. Accordingly, the pressure on minor dome 28 is roughly the presure differential between the first outer chamber 18 and the second outer chamber 19. Since the pressure in the second chamber 19 exceeds the pressure in the first chamber 18, this pressure differential may be thought of as an upwardly, or positively directed force vector. Further, since the pressure in the first outer chamber 18 exceeds the pressure in the toroidal zone, or torus, 17' the major dome region 16' of partition 16 is subject to a pressure differential which is the opposite of the pressure differential acting on the minor dome region 28 of the diaphragm 16, and may be thought of as a downwardly or negaively directed force vector. In other words the center of the flexible diaphragm 16 is subject to a positive pressure differential and the major dome 16' is subject to a negative pressure differential.

As will now be apparent, a radii variable pressure gradient extends radially outward from the center of diaphragm 16. Since the pressures at opposite ends of this pressure gradient are oppositely directed (upwardly and downwardly, or positively and negatively), a zero pressure differential must exist between the center of the diaphragm 16 and its circumference. This zero pressure differential determines the location of the junction or crease 29 between the blister 28 and unblistered portion of the flexible diaphragm 16. As will now be clear, the blistered 28 portion of the flexible diaphragm 16 is subject to an upward or positive pressure and the unblistered portion of the diaphragm is subject to a downward or negative pressure. As the control pressure in the first outer chamber is further reduced to further open the valve and increase fluid flow between the second outer chamber 19 and the central chamber 17, the positive pressure at the center of the diaphragm 16 increases and the negative pressure on the outer portion of the diaphragm decreases. Thereby causing the location of the zero pressure differential 29 to move radially outward which, in turn, causes the blister 28 to increase radially outward to increase the separation between the flexible diaphragms 15 and 16. Conversely, when the control pressure is increased to reduce fluid flow, the positive pressure at the center of the diaphragm 16 decreases and the negative pressure on the outer portion of the diaphragm increases, thereby causing the location of the zero pressure differential 29 to move radially inwardly, which, in turn, causes the blister 28 to decrease radially inward to decrease the spacing between the flexible diaphragms 16 and 16. As will now be clear, the control of biasing pressure in the first outer chamber 18 determines and controls the fluid flow through the valve.

The functional equivalence of the controlled fluid valve illustrated in FIGS. 1, 2, 3 and 4 to an electronic triode device will be readily apparent when the torus 17' is compared to a plate or collector, the second outer chamber 19 is compared to a cathode or emitter, the first outer chamber 18 is compared to a grid or base, and the fluid flow between the second outer chamber and the torus is compared to current flow. In a manner similar to the potential applied to the grid or base of an electronic device, the pressure applied to the first outer chamber 18 determines whether or not, and the amount of, fluid flow (current flow) that takes place between the second outer chamber 19 (cathode or emitter) and the torus 17' (plate or collector). In other words, the fluid valve of this invention is controlled by the magnitude of the control or biasing pressure present in the first outer chamber. As will be apparent from the above detailed description, the second flexible diaphragm 15 also functions as a resilient seat with which the first flexible diaphragm 16 may be brought into contact to close the valve in a manner such that critical interfitting of the valve and seat member is unnecessary. It is also apparent that operation of the fluid valve constituting the present invention does not require resilient restoring members or the application of gravitational force to open or close the valve. Further, the end plates 14 and 13 and the center ring 12, together with the first and second flexible diaphragms 16 and 15, are readily fabricated and assembled, making the fluid valve an economical device to build.

FIG. 5 illustrates a modification of the embodiment illustrated in FIGS. 1, 2, 3 and 4 which is particularly adapted to be rapidly switched between the full open and closed positions. The center ring 30, first and second end plates 32 and 31, inlet passageways 39, 41 and 43, flexible diaphragms 34 and 35, the port or aperture 45, central chamber 36 (consisting of toroidal zone 36' and control zone 36''), first outer chamber 37, and second outer chamber 38 are analogous in structure and function to the corresponding elements of the embodiment illustrated in FIGS. 1, 2, 3 and 4. In addition to these common features, the interior surface 33 of the second end plate 31, which constitutes a wall of the first outer chamber 37 remote from said central chamber 36, is so shaped, or configured, so as to limit the separation of the first and second flexible partitions 34 and 35, respectively. Accordingly, when the valve is opened the contoured surface 33 of the second end plate limits the outward movement of the first flexible diaphragm 34 in response to a reduced pressure appearing in the first outer chamber 37 by way of the inlet passageway 43. Therefore, when the pressure in the first outer chamber is increased at the same time that a reduced pressure appears in the central chamber 36 to close the valve, the first diaphragm 34 will quickly engage the second diaphragm 35 as they are already close together, thereby providing rapid operation between the full open and closed positions of the valve. Also, the inlet passageway 43 and the fluid conduit 44 are located substantially coaxially with the first outer chamber to prevent the first diaphragm 34 from blocking the inlet passageway 43 until the first diaphragm is in substantially full contact with the contoured surface 33 of the second end plate 31. The interior surface of the first end plate 32 is also shaped, or configured, so as to limit the volume of the second outer chamber 38. The reduced volume of the first and second outer chambers 37 and 38 reduces the capacity of the fluid valve illustrated in FIG. 5. Further, the inlet passageway 39 and fluid conduit 40 are coaxial with the second outer chamber 38 and the port, or aperture, 45 to increase fluid flow and decrease insertion losses when fluid flow takes place between the fluid conduit 40 and the fluid conduit 42 by way of the second outer chamber and the central chamber 36 when the valve is open.

FIGS. 6A and 6B illustrate, by cross-sectional views, a fluid valve in accordance with another embodiment of the present invention, in which the two flexible diaphragms and three chamber portions of the previously described fluid valves are replaced by a housing defining a cavity containing a single flexible diaphragm and two chamber portions. This is accomplished, in effect, by substituting a solid plate 51 having venting means 59 therein for the second outer chamber 19 and second diaphragm 15 described in conjunction with FIG. 1. The embodiment shown in FIGS. 6A and 6B comprises a housing including two end portions 50 and 51 which define a cavity. A flexible diaphragm 52 preformed into a section of a sphere, is located within the housing and has its outer circumferential portion pressure-sealed between the two end portions 50 and 51, to divide the cavity into first and second chamber portions 53 and 54, respectively. This flexible diaphragm is substantially identical to the first flexible diaphragm 16 illustrated in FIG. 1; and, like diaphragm 16 of FIG. 1, is divided into a major dome and a minor dome, viz, 54' and 54'', respectively. Chamber 54 consists of toroidal zone 54' and central zone 54''. An inlet passageway 57 is provided into the first chamber 53 portion by way of the fluid conduit 58 and has a control, or biasing, pressure applied thereto. An inlet passageway 55 provides access into the second chamber portion by way of the fluid conduit 56 and has a power source, such as a vacuum pump (not shown), applied thereto. Additional access or venting means is provided into the second chamber 54 portion by way of the passageway 59 formed in part by the fluid conduit 60. Atmospheric, or a reference pressure, as described above, is applied to this fluid passageway, the size of which is sufficiently small so that its flow impedance prevents equalization of the pressure within the passageway 59 and the second chamber 54 when the valve is open.

The operation of this valve is such that when the pressure in the first chamber portion 53 is greater than the reduced pressure applied to the fluid conduit 56, the flexible diaphragm 52 is forced downwardly, thereby blocking the fluid passageway 59 and preventing fluid flow between the passageway 59 and the inlet passageway 55 by way of the second chamber 54, as illustrated in FIG. 6A. The valve is opened by reducing the pressure in the first chamber portion 53 by way of the fluid conduit 58, thereby causing the pressure in the first chamber portion to become less than the pressure existing in the fluid passageway 59. This moves the flexible diaphragm 52 upwardly to unblock the inlet passageway 59, thereby permitting fluid flow between the passageway 59 and the passageway 55, by way of the second chamber portion 54, in a manner similar to that described hereinabove in conjunction with FIGS. 1 through 4, and as illustrated in FIG. 6B. Further reduction of the pressure in the first chamber portion 53 increases the upward movement of the flexible diaphragm 53, thereby permitting a greater fluid flow between the inlet passageway 59 and the passageway 55 by way of the second chamber portion. This increase in fluid flow will continue until the pressure in the first chamber portion 53 is reduced to a point where the inner wall portion 61 of the end portion 50 at which time the fluid valve is fully opened.

In the fluid valve described in FIGS. 1 through 5, a seal was obtained by bringing together two flexible diaphragms due to a reduced pressure existing in a torus located therebetween. Due to the flexibility of the diaphragms, creases or wrinkles in one diaphragm are followed by the other diaphragm, such that a good seal is obtained, regardless of such wrinkles or creases. Accordingly, the fabrication tolerances in making the device illustrated in FIGS. 1 through 5 is not critical and the device is readily fabricated. In the device illustrated in FIGS. 6A and 6B, however, it is important that the inlet passageway 59 be located substantially coaxially with the preformed diaphragm 52, such that when the valve is closed, the flexible diaphragm will press against, and seal, the area on the inner surface 62 of the end portion 51 adjacent the inlet passageway 59. Accordingly, more care is required in the fabrication of the device illustrated in FIGS. 6A and 6B to obtain an operable device, than that required in fabricating the devices illustrated in FIGS. 1 through 5. Following the practice adopted in connection with FIGS. 1 and 4, this seal area, or contact area, is designated 63, whereas the throat formed when diaphragm 52 is not in contact with surface 62 (FIG. 6B) is designated 63'. As in the previously described devices the control or biasing pressure in the first chamber portion 53 of the device illustrated in FIGS. 6A and 6B determines whether the valve is open, and the amount of fluid flow which takes place between the inlet passageway 59 and the passageway 55 by way of the second chamber portion 54. That is proportionally, the valve of FIGS. 6A and 6B is controlled and is the functional equivalent of an electronic triode device. A comparison of the device illustrated in FIGS. 6A and 6B and the devices previously described in conjunction with FIGS. 1 through 5, will show that the flexible diaphragm 52 of FIGS. 6A and 6B functions substantially identically to the flexible diaphragm 16 of FIG. 1.

A plurality of devices as illustrated in FIGS. 1 through 6 can readily be fabricated and interconnected by means of a stack of laminae such as illustrated in FIGS. 7 and 8. FIG. 7 illustrates a single integral unit which contains a plurality of intercoupled fluid devices as described hereinabove, and comprises a plurality of layers of suitable material from which the fluid valves can be readily constructed, as illustrated in FIG. 8, which shows a cross-section of the unit illustrated in FIG. 7.

Referring to FIG. 8 it is seen that various ones of the layers of material have holes or openings drilled, or otherwise formed, therethrough, or partially therethrough, and grooves etched or otherwise formed to provide passageways between various fluid devices. For example, the layer of material 65 has a circular indentation 66 therein which, together with a flexible diaphragm 68, comprises the first or control chamber 67 of a controlled fluid valve, and the layer of material 69 has a circular opening 70 therein which, together with the flexible diaphragm 68 and a flexible diaphragm 71, constitute the central chamber portion 73 of a controlled fluid valve, as described hereinabove in conjunction with FIGS. 1 through 5. Also, the layer of material 75 contains a circular opening 74 therein which, together with the flexible diaphragm 71 and a layer of material 76, constitutes the second outer chamber portion 72 of a fluid valve as described above. Power in the form of suction is applied to the fluid valve by way of the fluid conduit 77 and the opening 78 drilled into the laminae structure which opens into the central chamber portion 73. This reduced pressure, or suction, can also be applied to other fluid valves (not shown) by way of the groove 79 in the layer of material 69, which groove is coupled to the central chamber 73 and, therefore, to the power supplied to the conduit 77, but will be modified by operation of this valve as explained below. Control, or biasing, pressure is applied to the valve by way of the fluid conduit 80 which provides access into the first or control chamber 67 and a groove 81 in the layer of material 65 may carry this control pressure to other fluid valves (not shown). Likewise, a groove 82 in the layer of material 75 may couple the second outer chamber portion 72 to atmosphere. A reference pressure or some other pressure source may be coupled to the groove 82 by way of a fluid conduit. As will now be apparent, each layer, or lamina, in the stack coacts with the others of the layers, or laminae, to define a plurality of separate ones of said fluid valves with means for intercoupling the valves in any desired manner. The structure illustrated in FIGS. 7 and 8 may be utilized to design and fabricate complex fluid logic apparatus and systems where a large number of interconnected fluid valves, as previously described, are used.

The flexible diaphragms of the above-described embodiments of the instant invention may consist of either elastic or inelastic material. In fact, elasticity of the diaphragms may be attended with disadvantages, as compared with inelastic diaphragms. That is, the additional energy employed in unnecessarily deforming and moving elastic diaphragms to carry out the instant invention constitutes a burden with no accompanying benefits and, in fact, may necessitate the use of larger conduits throughout a logic system and an increased power source in order to provide the displacement flows necessary for actuating the fluid valves. These disadvantages of an elastic diaphragm will, of course, be particularly apparent in high speed fluidic systems employing devices such as that shown in FIG. 5. Accordingly, while it may be seen that the use of both elastic and inelastic diaphragms is embraced within the scope of the present invention, inelastic diaphragms will be preferred for many purposes. That is, the most desirable material for the diaphragms of the present invention will be material of high flexibility and low elasticity. Further, the elasticity of the material used for the flexible diaphragms relative to its thickness should be such that deflecting, beveling, etc., of the diaphragms causes low losses in the material. It has been found that one to one-half mil thick Mylar or polyethylene is suitable for small (about a quarter inch in diameter) valves.

What has been described is a controlled fluid valve which is simple and economical to fabricate, which may be made very fast acting, and which is adapted for use in certain specialized applications, such as fluid logic and computation apparatus.

Obviously, many modifications and variations of the present invention are possible in light of the above-detailed description. It is, therefore, to be understood that within the scope of the appended claims, the invention may be practiced otherwise than as specifically described.

What is claimed is:

1. A valve comprising: a housing divided into a central chamber and first and second outer chambers by first and second flexible partitions located within said housing, said second partition defining at least a portion of said second outer chamber and including venting means, said venting means constituting a sufficiently large flow impedance so that said second partition can be outwardly domed by fluid pressure within said second outer chamber exceeding the fluid pressure within said central chamber, at least the portion of said second partition adjacent said venting means constituting when said second partition is outwardly domed a resilient seat with which said first partition may be brought into contact to close said venting means thereby blocking the flow of fluid between said second outer chamber and said central chamber, said venting means being adapted to be opened and closed by said first partition due to the relative pressures in said chambers.

2. A valve as claimed in claim 1 in which said central and outer chambers are provided with access means, the access means of said first outer chamber serving to provide control pressures therein whereby said first partition may be selectively brought into contact with, and withdrawn from, said second partition to respectively close and open said venting means.

3. A valve as claimed in claim 1 in which the wall of said first outer chamber remote from said central chamber is so configured as to limit the separation of said partitions.

4. A valve as claimed in claim 3 in which an access pipe leading to said first outer chamber is located coaxially therewith whereby said first partition is prevented from blocking said access pipe until said first partition is in substantially full contact with said wall remote from said central chamber.

5. A valve comprising: a housing defined by nonflexible walls, an imperforate flexible partition dividing the interior of said housing into first and second chamber portions, venting means terminating flush with a central portion of the wall of said second chamber portion opposite said partition, the periphery of said partition being located in a plane which is remote from the plane containing said central portion of the wall of said second chamber, said flexible partition further being inelastic and being of lesser area than the total non-flexible wall area of said second chamber portion, and thus being incapable of contacting an annular portion of the wall of said second chamber portion lying immediately adjacent its periphery under the influence of any combination of applied fluid pressures less than rupturing pressure, second venting means passing through said annular portion of the wall of said second chamber portion, and third venting means communicating with said first chamber portion.

References Cited

UNITED STATES PATENTS

| | | | |
|---|---|---|---|
| 3,332,322 | 7/1967 | Beck | 251—331 X |
| 2,556,596 | 6/1951 | Perkins et al. | 251—61 X |
| 2,943,643 | 7/1960 | Pinter et al. | 251—61 X |
| 1,017,857 | 2/1912 | Doman | 251—61.1 X |
| 2,529,028 | 11/1950 | Landon | 92—98 X |
| 2,905,431 | 9/1959 | Gilbert | 251—61.1 |
| 3,176,714 | 4/1965 | Smith et al. | 137—596.16 |
| 3,245,426 | 4/1966 | Kreuter et al. | 137—525 X |
| 3,252,481 | 5/1966 | Meier | 137—625.4 |

FOREIGN PATENTS

| | | |
|---|---|---|
| 656,585 | 9/1951 | Great Britain. |
| 723,537 | 2/1955 | Great Britain. |

ARNOLD ROSENTHAL, Primary Examiner

U.S. Cl. X.R.

235—201, 251—367